United States Patent Office 3,769,311
Patented Oct. 30, 1973

3,769,311
ETHOXYLATED CARBOXY CONTAINING QUATERNARY AMMONIUM COMPOUNDS AND PROCESS FOR MANUFACTURING SAME
Leonard J. Armstrong, 144 Jefferson Ave., Janesville, Wis. 53545, and Eldon De Vere Dawald, 1250 Partridge Ave., Beloit, Wis. 53511
No Drawing. Continuation-in-part of application Ser. No. 661,200, Aug. 17, 1967, which is a continuation-in-part of application Ser. No. 368,341, May 18, 1964, both now abandoned. This application Dec. 18, 1970, Ser. No. 99,669
Int. Cl. C07c *141/04*
U.S. Cl. 260—459                                                  7 Claims

ABSTRACT OF THE DISCLOSURE

The compounds are of the class of quaternary ammonium salts containing one or two

groups on the quaternary nitrogen atom, wherein M is hydrogen or an alkali metal cation and $n$ is an integer from 1 to 15. Such compounds are characterized by complete amphoterism in alkaline and acid media, a high degree of solubility at any pH, and are useful as surface active agents.

---

This application is a continuation-in-part of application Ser. No. 661,200, filed Aug. 17, 1967 by the present inventors and now abandoned, which application is itself a continuation-in-part of application Ser. No. 368,341, filed May 18, 1964 by the present inventors and now abandoned.

The present invention relates to new and improved chemical compounds and the process for making same and more particularly to novel compounds having surface active properties such as foaming, wetting, solubility and detergency.

The compounds of the present invention have the following general formula:

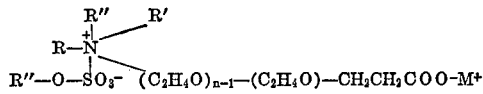

wherein:

$n$ is an integer in the range of 1–15 inclusive,
R is a hydrocarbon radical having from 4 to 22 carbon atoms which may be either aliphatic and straight or branch chain, or cycloaliphatic, or aliphatic aromatic with the aliphatic portion being attached to an aromatic nucleus and having a least 4 carbon atoms,
R' is a radical selected from the class consisting of R groups, $(C_2H_4O)_{x-1}$—$C_2H_4OH$ groups and

groups,
M is an alkali metal or is hydrogen,
R" is a lower alkyl radical containing from 1–3 carbon atoms and wherein, R' contains $C_2H_4O$ groups, $n-1$ will be replaced by $y-1$, in which case, $x+y$ will be equal to $n$, and $n$ is an integer in the range of 2–15. As can be seen from a consideration of the formula given above, $x$ and $y$ both can range from 1 to 14 depending upon the value of $n$. However, for practical purposes, $x$ and $y$ will both be essentially equal to $n/2$ subject to minor statistical variations based upon a standard distribution probability curve.

Compounds of the present invention have utility as household industrial cleaners, germicidal agents, fabric softeners, lubricants and corrosion inhibitors, and can be used wherever surface active agents are needed, e.g. cosmetic and shampoo preparations, plating baths and emulsification generally.

In general, a surface active compound i.e. a surfactant, can best be described as being a molecule, usually a large molecule, one end of which is water soluble and the other end water insoluble. Surface activity arises from this dual nature which permits the compound to be absorbed and oriented at an interface to thereby reduce the surface energy. If the interface is liquid—liquid such as oil water for example, the surfactant tends to concentrate at the interface and act as an emulsifier. With a liquid-gas interface as is formed between water and air for example, the concentration will produce foaming. In the case of a liquid-solid interface, such compounds act as wetting agents concentrating at the solid surface. Products presently used as surface active agents in household and industrial applications can be largely categorized in three broad classifications. These are (1) anionic, (2) cationic and (3) nonionic.

Anionic surfactants, typified by soap or by the alkyl aryl sulfonates, are compounds in which the fatty portion of the molecule is negatively charged. Solubility is provided by the salt-like nature of the compound which ionizes into positive and negative ions when dissolved in water. The ionizable group in ordinary soap, for example, is a carboxyl group attached to a fatty acid chain and either a sodium or a potassium atom. This type of compound functions well as a cleaning agent because the principal part of the molecule carriees a negative charge in solution identical with the electrical charge carried by most materials in nature. After exerting its action on the soil particles either by emulsification or other means the soap tends to be repelled from the cleaned article and carries away the dirt with it.

In the case of cationic surfactants, the fatty portion of the molecule carries a positive electrical charge. These compounds are usually characterized by the presence of an amino group which being basic can form a salt with acids. Such salts ionize to give a large positively charged ion and a much smaller negatively charged ion. When dissolved in water, the large positively charged ion is attracted to such things as textile fibres or metallic surfaces for example. Consequently, cationic surfactants have found wide commercial use not as cleaning agents, but as germicidal agents, fabric softeners, and the like.

The third large group of surface active agents are generally referred to as nonionic compounds where the molecule is not ionized and carries no electrical charge. Solubilization occurs as a result of hydrogen bonding between the molecules of water and the ether oxygen atoms in the surfactant.

A fourth group of surface-active compounds contain both carboxyl and amino functionality in their structure and are sometimes called amphoteric. These molecules are found in nature in the form of proteins which are generally large molecules containing both carboxyl groups and amino groups and which consequently can carry both positive and negative electrical charges in the same molecule. The simplest example of this kind of compound is an amino acid which can form a salt of the carboxyl group in alkaline solution or a salt of the amino group in acid solution.

Amphoteric compounds are also capable of forming so-called zwitter ions as a result of self-neutralization or internal compensation by which the carboxyl group tends to neutralize the amino group in the same molecule and thereby produce a much milder acid or alkali activity than the respective carboxyl or amino group would produce if it were not so affected.

Heretofore, a few surface active agents containing the essential characteristics of the amino acids have been developed synthetically. These molecules have a carboxyl group which can give a negative ion in alkaline solution and also an amino group which can give a positive ion in acid solution. Two different types of amphoteric surface active agents which have received attention commercially are the Deriphats manufactured by General Mills, Inc. and the Miranols manufactured by the Miranol Chemical Company, Inc. Both groups of compounds possess a basic amino group connected through one or two carbon atoms to a carboxyl group within the same molecule. The Deriphats are N-fatty beta-iminodipropionates or N-fatty beta-aminopropionates made by reacting a primary (fatty) amine with an acrylic monomer.

Deriphat type $\overset{+}{R}NH_2CH_2CH_2COOH$     Acid range $\overset{+}{R}NH_2CH_2CH_2COO^-$     Neutral range $\overset{-}{R}NHCH_2CH_2\overset{+}{COOM}$     Alkaline range The Miranols are ethylene cycloimido, 1-alkyl (fatty), 2-hydroxy ethylene sodium alcoholate, methylene sodium carboxylates with slight modifications, as represented by the following formula:

Miranol type

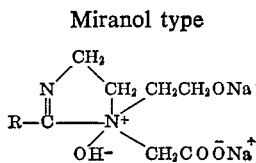

Both of the products described in the prior art will exhibit attraction toward surfaces as a result of the positive charge. They also exhibit cleaning properties and repulsion from the cleaned surface as a result of the negatively charged portion of the molecule. However, under relatively neutral conditions both types of compounds suffer from the problem that there is a tendency of the two groups in the molecule to neutralize one another electrically. The result of this inner neutralization action appreciably reduced the solubility of the compound over a broad pH range which extends from about 4.5 to 9. Accordingly, they are not effective cleaners under neutral or near neutral conditions. Further, in the case of the Deriphats in particular, the amino group of these compounds has little opportunity to form salts in strongly alkaline solutions and consequently the potential tendency of the molecule to be attracted to negatively charged materials is largely eliminated under alkaline conditions.

In an effort to solve some of the problems associated with the individual types of surface active agents heretofore available, various attempts have been made by others to produce stable mixtures of two or more surface-active compounds. Hans S. Mannheimer has found that the eye and skin irritation often associated with shampoos in which the active component is an anionic surface active agent, can be substantially eliminated by forming an addition product of the anionic compound with a metal salt of an amino carboxylic acid. This characteristic of conventional anionic surfactants, such as the sodium salt of lauryl sulfate ($C_{12}H_{25}$—$OSO_3$—Na), and its ether or ester modifications, for example, the sodium salt of lauryl diethoxy-ether sulfate $$(C_{12}H_{25}-O-(C_2H_4O)_2-SO_3-Na)$$

and the sodium salt of sulfated esters of lauric acid, (e.g. $C_{11}H_{23}$—COO—$C_2H_4$CHOHCH$_2$—OSO$_3$—Na) apparently is suppressed by attaching the anion portion of the molecule to the nitrogen atom of a metal salt of an amino carboxylic acid to form addition products represented by the general formulae set forth below:

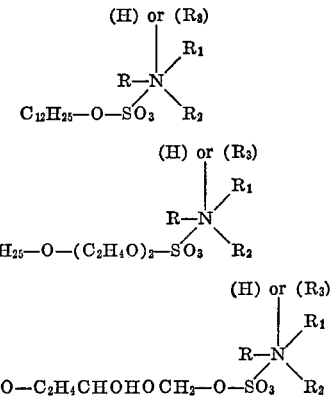

Unfortunately, addition products of the above type which are disclosed in U.S. Pat. 2,781,377, 2,781,382, 2,781,388, 2,781,390, 2,781,391 and 2,781,392, suffer from the fact that their use is quite restricted due to their limited solubility and inherent instability in acidic and basic media.

The present invention obviates the above and other difficulties of the prior art and provides a whole new family of compounds having markedly improved properties while retaining all of the advantageous properties of previously available amphoteric surface active agents. In accordance with this invention, a surfactant is provided which is characterized by complete amphoterism in alkaline and acid media and a high degree of solubility at any pH including the middle or neutral pH range. In these compounds the tendency for intra-molecular salt formation by closing a 5 or 6 membered ring is non-existent. Further, the molecules contain the advantageous feature of the nonionic class of detergents, namely the presence of ether-type oxygen linkages capable of hydrogen bonding with water which also permits greater solubility. An additional feature of the present invention is the presence in these compounds of the quaternary ammonium salt capable of ionizing under all pH conditions which provides at all times the advantages of the cationic center in the molecule and permits it to get down to a surface rapidly so that the other portions of the molecule can immediately begin their action.

In broad scope, the present invention provides a novel class of compounds each of which can be defined as a quaternary ammonium salt containing one or two —(alk O)$_{n-1}$—(alk O)—CH$_2$CH$_2$COOM groups on the quaternary nitrogen atom, wherein the (alk O) group is an alkyleneoxy group selected from the class consisting of ethylene oxide, propylene oxide and butylene oxide or a mixture thereof; M is a salt forming cation or is hydrogen; and $n$ is an integer from 1 to 60 inclusive. Preferably, in accordance with the present invention, the alkyleneoxy group is a $C_2H_4O$ group, the salt forming cation is an alkali metal and $n$ is an integer from 1 to 15.

Compounds prepared from primary amines contain the following group:

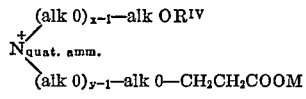

where $x+y=n$, and $R^{IV}$=H or CH$_2$CH$_2$COOM.

Compounds prepared from secondary amines have the following group:

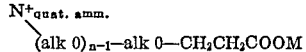

One of the general types of method which can be employed for the production of the compounds of the present invention consists in first reacting a primary amine or a secondary amine with an alkylene oxide such as for example, ethylene oxide, propylene oxide, butylene oxide or mixtures thereof in accordance with the following reaction using ethylene oxide to illustrate the process:

With a primary amine—

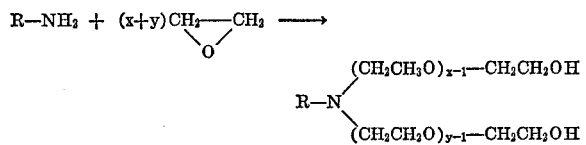

or, in the case of a secondary amine—

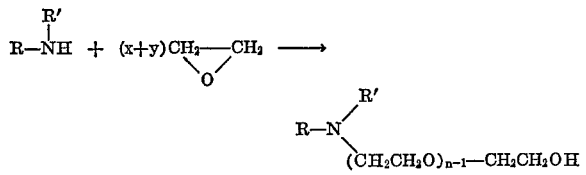

R and R' radicals can be the same as or different from each other and preferably in either case each is a saturated or unsaturated hydrocarbyl group containing from 4 to 22 carbon atoms.

The amines which can be employed in this reaction include the fatty amines, either saturated or unsaturated i.e. alkyl or alkenyl, and either straight or branched chain. They can be isolated pure amines or composed of a mixture of amines, e.g. the mixture of amines obtained from the mixed acids of a fat or oil of animal, marine or vegetable origin, including the acids of coconut, palm kernel and palm oil, soy bean, linseed, olive, rapeseed, cottonseed, peanut and castor oil and the like. Suitable amines also are those derived from tallow, fish and seal oils, whale or shark oils and the hydrogenated acids from these sources. Moreover, the synthetic high molecular weight fatty acids, obtained by the oxidation of paraffin wax and similar hydrocarbons, can be used as a source for suitable amines. In addition the amine can be from one of the resinic acids such as abietic acid or the naphthenic acids and long chain fatty acids having an aromatic hydrocarbon radical connected directly with the aliphatic chain as are obtainable from oleic, ricinoleic, linoleic and similar unsaturated fatty acids. Amines from single acids which also can be employed include caproic, pimelic, heptylic, caprylic, undecylic, lauric, palmitic, stearic, behenic, arachic, cerotic, oleic, erucic, linolenic, ricinoleic and hydroxy stearic acids. Furthermore, amines produced by ammoniation or amination of unsaturated hydrocarbons, fatty alcohols, alkyl halides and alkyl sulfates may also be employed. Most preferably, the amine is selected so that in the final product, R will be a saturated or unsaturated hydrocarbyl radical containing from 4–22 carbon atoms.

The product of the ethoxylation reaction outlined above is thereafter reacted with one mole or more or a monomeric acrylic ester. Suitable esters of acrylic acid are methyl, ethyl, propyl and the butyl esters which can be added to a terminal hydroxyl group as illustrated below.

Primary amine:

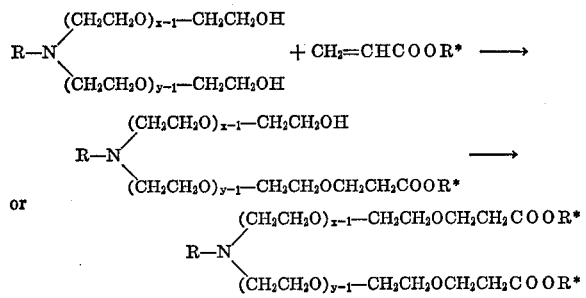

Secondary amine:

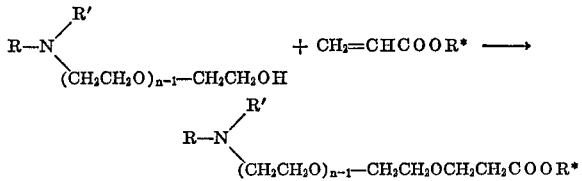

The ester obtained by the acrylic ester addition is thereafter hydrolyzed and converted to any suitable anionic derivative. Advantageously, an alkali hydroxide can be utilized for this hydrolysis step. The compounds produced, using potassium hydroxide for example, are illustrated below.

Starting with a primary amine:

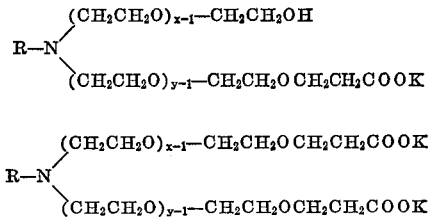

Starting with a secondary amine:

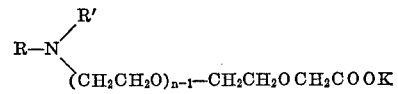

The final step in this synthesis of the compounds of the present invention is the quaternization of the tertiary amine group with a suitable alkylating agent. Preferably, the alkylating agent employed will be selected from the group consisting of dimethyl sulfide or diethyl sulfate.

For example, a compound prepared from primary amines and quaternized with dimethyl sulfate for instance, will have the following formula:

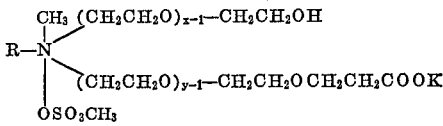

Similarly, compounds made from secondary amines will be represented by the formula given below:

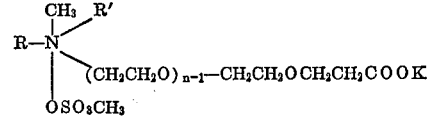

From the above it can be seen that R" will be a lower alkyl radical containing from 1 to 3 carbon atoms.

The following examples are presented as illustrative of the present invention, it being understood that such examples are given for the purpose of illustration only and are not to be construed as limiting in any way the scope of the present invention.

EXAMPLE

In this example, 267 grams (1 mole) of octadecenyl amine was heated to 110° C. for 30 minutes to decompose any amine carbonate present. The amine was then introduced into a three-necked flask fitted with a stirrer, thermometer, condenser and sparger tube. 0.5 gram (0.25%) of sodium hydroxide was introduced as a catalyst and 220 g. of ethylene oxide (5 moles) slowly added. The temperature during this addition was maintained in the range of 135°–160° C. Pressure in the range of 2–3 lbs. was maintained until all the ethylene oxide had been introduced and the reaction was complete.

The ethoxylated amine was then cooled to 125° F. and 125 g. (1.25 moles) of ethyl acrylate added slowly. The vessel was heated to raise the temperature to 200° F.

over a period of one hour and held at that point for an additional three hours. Unreacted ethyl acrylate was removed under vacuum (5 mm.). The ester formed was thereafter hydrolyzed by adding 250 g. of cold water, 75 g. of isopropanol and 61.6 g. of potassium hydroxide (1.1 moles). The potassium hydroxide was added slowly during which time the temperature rose to 175°–180° F. This temperature was maintained for 3 hours to complete the hydrolysis reaction. The tertiary amine group was then quaternized by cooling the reaction mixture to 130° F. and adding 126 g. (1 mole) of dimethyl sulfate from a dropping funnel while holding the temperature in the range of 130°–140° F. by cooling.

Thirty minutes after the dimethyl sulfate addition was complete, 300 g. of water was added to reduce the active product concentration to about 50 percent. The aqueous solution of the compound produced was clear and had a dark amber color. It was completely soluble in a 15 percent solution of sodium hydroxide and in a 20 percent solution of potassium hydroxide. Diluted solutions in water were tested and found to be excellent penetrants and hard surface cleaners.

A large number of representative compounds, i.e. quarternary ammonium salts containing at least one $$-(C_2H_4O)_{n-1}(C_2H_4O)-CH_2CH_2COOM$$

group in accordance with the present invention have been prepared in the manner described in the above example. These compounds exhibited excellent surfactant properties and were found to be completely amphoteric in alkaline and acid media, having a high degree of solubility at any pH. For example, amines which have been employed in the manufacture of compounds of the present invention with the respective amounts of each shown in parenthesis, include the mixed amines from soy bean oil (266 g.), dodecyl amine (185 g.), the mixed amines from coconut oil (200 g.), the mixed amines from tallow (270 g.), the mixed amines from hydrogenated tallow (272 g.), and dicoco amine (383 g.). Best results are obtained by starting with an amine having an alkyl or alkaryl radical or radicals (in the case of secondary amines) in which the alkyl group contains from 4 to 18 carbon atoms, e.g. $C_4H_9NH_2$, $C_6H_{13}NH_2$, $C_{10}H_{21}NH_2$, $C_{12}H_{25}NH_2$, $C_{18}H_{37}NH_2$ and the like or by starting with an alkenylamine e.g. $C_{18}H_{35}NH_2$.

The alkylene oxide reaction with an amine to form the polyglycol chains attached to a nitrogen atom can be carried out using in the range of from 1–15 moles of alkylene oxide per mole of amine. Generally, it will be desirable to utilize from 2 to about 15 moles of the alkylene oxide. Specific mole ratios by way of example, which have been used in the manner described herein to produce excellent surfactants are 2:1 (88 g. of ethylene oxide); 3.5:1 (154 g. of ethylene oxide); 4:1 (88 g. ethylene oxide mixed with 116 g. of propylene oxide); 5:1 (220 g. of E.O.); 2:1 (144 g. of butylene oxide); and 10:1 (440 g. of E.O.). Conventional catalysts such as sodium hydroxide, potassium hydroxide, potassium carbonate and sodium acetate were employed. Advantageously, a steel autoclave can be used in place of a three-necked flask. In such instance pressure in the range of 30–50 lbs. is desirable. Isopropanol is also a suitable catalyst for the ethoxylation reaction in which case the temperature during addition of the ethylene oxide should be maintained in the range of 60°–80° C.

The acrylate ester addition can be carried out under a variety of temperature and time conditions using in the range of 1 to 2 moles of monomeric acrylate ester per mole of amine. Esters which have been successfully utilized include methyl, ethyl and butyl acrylate. This reaction in which the ester is added to one or both terminal hydroxyl groups can be carried out at a temperature in the range of 90°–200° F. over a period of from 3–40 hours. Hydrolysis of the ester grouping is then obtained in the conventional manner using water and a suitable solvent such as isopropanol, methanol, ethanol, hexylene glycol or the like. Alternatively, no extraneous solvent need be employed.

The conversion to the anionic derivative to a salt is obtained using any suitable reagent containing an ion commonly used as a cation with anionic surface active agents. These include alkali or alkaline earth metal hydroxides such as sodium, potassium, magnesium, calcium, barium and the like. In some instances it may be desirable to convert the compound to a salt of a Group III metal such as aluminum, or the like, in which case the appropriate hydroxide can be employed. Other examples of ions capable of cation formation ($M^+$) as a salt with the carboxyl groups of the novel compounds disclosed herein, are lithium, copper, silver, zinc, strontium, cadmium, ammonium, ethanol ammonium, isopropyl ammonium, and the like.

Quaternization of the tertiary amine group has been obtained using a variety of alkylating agents. These include for example, dimethyl sulfate (126 g.) at 130°–140° F.; and diethyl sulfate (154.5 g.) at 130°–140° F.

Similar compounds to those described above are obtained using secondary amines. Alternatively, dimer or trimer amines can be employed. The following example is set forth to further illustrate the reaction of secondary amines to produce the novel compounds of the present invention. In this reaction 383 g. of dicoco amine (chiefly $C_{12}$) was reacted with 3 moles of ethylene oxide in the presence of 1 g. of potassium hydroxide as a catalyst. The acrylate ester addition was obtained using 1.2 moles of methyl acrylate. The resulting product was thereafter hydrolyzed and converted to the potassium salt using 250 g. of water, 150 g. of isopropanol and 1 mole of potassium hydroxide. The final compound having exceptional cleansing properties was obtained by quaternization using 1 mole of dimethyl sulfate. Reaction conditions were essentially the same as those described above for compounds made from primary amines.

COMPARATIVE EXAMPLES

The example given above discloses the manner in which a primary amine such as octadecenyl amine can be used as a starting material in accordance with the present invention to produce the novel compound which can be represented by the structural formula designated A:

Compound A (this invention)

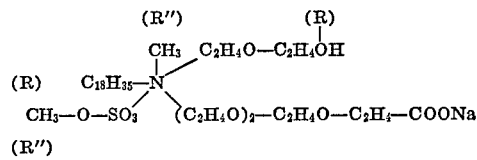

In order to compare the properties of compounds of the present invention with compounds containing anion groups of the same type disclosed by Mannheimer, a compound having the formula set forth below (designated VI) was prepared by modifying the process of the present invention to produce a quaternary ammonium salt having as an anion group the $C_{12}H_{25}$—O—$SO_3$— group, which is the same anion as the anion contained in the compounds disclosed by Mannheimer in U.S. Pat. 2,781,392:

Compound VI (modified)

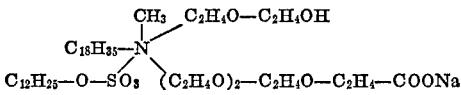

Similarly, a compound having the formula set forth below (designated IV) was prepared by modifying the process of the present invention to produce a quaternary ammonium salt having an anion group the $$C_{12}H_{25}-O-(C_2H_4O_2)-SO_3-$$

group which is the same anion as the anion contained in the compounds disclosed by Mannheimer in U.S. Pat. 2,781,390:

Compound IV (modified)

$$C_{12}H_{25}-O-(C_2H_4O)_2-SO_3 \quad C_{18}H_{35}-N\begin{pmatrix}CH_3 & C_2H_4O-C_2H_4OH \\ (C_2H_4O)_2-C_2H_4O-C_2H_4-COONa\end{pmatrix}$$

A 50% solution of Compound A in water was prepared with a pH of approximately 8.5. This solution was compared with 50% solutions of Compounds IV and VI in water also prepared with a pH of approximately 8.5. The solubility of each of the three compounds in concentrated base was tested using a 15% solution of sodium hydroxide and a 20% solution of potassium hydroxide. Results obtained are set forth below in Table I:

TABLE I.—COMPARISON OF THE SOLUBILITY OF COMPOUND A WITH COMPOUNDS IV AND VI

|  | 15% NaOH solution | 20% KOH solution |
|---|---|---|
| Compound A | Completely soluble | Completely soluble. |
| Compound IV | Insoluble | Insoluble. |
| Compound VI | do | Do. |

As can readily be seen from the test results set forth, the surfactant compounds of this invention are completely soluble in concentrated alkaline solutions. In view of this unexpected degree of effectiveness and high caustic tolerance, such compounds have great utility in a wide range of cleaning applications whereas similar compounds containing the anion group which might be suggested by Mannheimer's modified shampoo agents cannot be used, e.g. in industrial formulations for heavy metal cleaning where acidity must be avoided, in steam cleaners without the necessity of adding hydrotropic (coupling) agents, and in basic cleaning solutions for aluminum.

The utility of the surfactant compounds of this invention was further demonstrated by using such compounds to make industrial type formulations of heavy duty cleaners. Two such formulations each containing 10 wt. percent of Compound A are shown in Table II and identified and formula No. 2 and No. 4. For comparison, the same cleaners containing Compound VI in place of Compound A are shown and are identified as formula No. 1 and No. 3:

TABLE II.—COMPARISON OF THE UTILITY OF COMPOUNDS A AND VI

| | Industrial formula (parts by weight) | | | |
|---|---|---|---|---|
| | 1 | 2 | 3 | 4 |
| Compound A | | 100 | | 100 |
| Compound VI | 100 | | 100 | |
| Gluconic acid | 35 | 35 | | |
| Sodium hydroxide (78%) | | | 52 | 52 |
| Potassium hydroxide (45%) | 200 | 200 | | |
| Na metasilicate pentahydrate | 100 | 100 | 26 | 26 |
| Versene 100 | 35 | 35 | 70 | 70 |
| Tetrapossium pyrophosphate | 20 | 20 | | |
| Light soda ash | | | 23 | 23 |
| Water | 510 | 510 | 729 | 729 |
| Total | 1,000 | 1,000 | 1,000 | 1,000 |

Formulations No. 1 and No. 3 containing Compound VI were found to be completely unstable. Both immediately separated and would not go into nor stay in solution. In comparison, Compound A immediately went into solution. Formulations No. 2 and No. 4 were clear, remained stable without any visible separation and were successfully employed as effective cleaners.

The above results clearly show that compounds of the present invention have unexpected properties not exhibited by the compounds containing the anion group which might be suggested by the sulfate quaternary salts of the prior art, and that by reason of such properties these novel compounds have utility far surpassing that of conventional surfactant compounds. These unexpected properties are related to the chemical composition of the compounds of this invention which differ markedly in structure from prior art compounds such as are disclosed by Dr. Mannheimer. For example, it is noted that in the compounds disclosed in column 4 of each of U.S. Pats. No. 2,781,381; 2,781,290 and 2,781,292, the quaternary anion group is chlorine or hydroxyl in each case, whereas the anion group of the compounds of this invention is a methyl, ethyl or propyl sulfate ion. Moreover, all of the compounds of the present invention have an ethylene group ($C_2H_4$) between the ethoxy group and the carboxyl, whereas following the teachings of the Mannheimer patents would result in having a methylene ($CH_2$) group in those positions. That such groups are not equivalent is seen from consideration of the fact that compounds of the general type:

$$R-N\begin{pmatrix}C_2H_4OH \\ CH_2COOK\end{pmatrix} + C_6H_5CH_2Cl \longrightarrow R-N\begin{pmatrix}C_6H_5 \\ CH_2 \quad C_2H_4OH \\ Cl \quad CH_2COOK\end{pmatrix}$$

which is a stable compound in alkaline medium, differ from compounds of the general type:

$$R-N\begin{pmatrix}C_2H_4OH \\ CH_2CH_2COOK\end{pmatrix} + C_6H_5CH_2Cl \longrightarrow R-N\begin{pmatrix}C_6H_5 \\ CH_2 \quad C_2H_4OH \\ Cl \quad CH_2CH_2COOK\end{pmatrix}$$

which in alkaline medium breaks down spontaneously.

The above examples are intended to be illustrative only and not at limiting the invention. It will be apparent from the examples that considerable variation is possible in the method of manufacturing typical compounds within the group which they represent. It is also apparent that other compounds having the same general formula may be used as examples of the group with the same or similar effect. Numerous other modifications may be devised by those skilled in the art without departing from the spirit and scope of the invention.

What is claimed is:

1. A compound of the following formula:

$$R-N\begin{pmatrix}R'' \quad R' \\ (C_2H_4O)_{n-1}-C_2H_4O-CH_2CH_2COOM \\ R''-O-SO_3\end{pmatrix}$$

in which:

$n$ is an integer from 1 to 15,

R is alkyl or alkenyl of 4–22 carbon atoms,

R' is a radical selected from the group consisting of R, $$(C_2H_4O)_{x-1}-C_2H_4OH$$

and $(C_2H_4O)_{x-1}C_2H_4O-CH_2CH_2COOM$,

R'' is methyl, ethyl of propyl,

M is hydrogen or an alkali metal, and wherein, when R' contains $C_2H_4O$ groups, $n-1$ will be replaced by $y-1$, in which case $x+y$ will equal $n$, and $n$ is an integer from 2 to 15.

2. A compound of the following formula:

$$R-N\begin{pmatrix}R'' \quad (CH_2CH_2O)_{x-1}-CH_2CH_2OCH_2CH_2COOM \\ (CH_2CH_2O)_{y-1}-CH_2CH_2OCH_2CH_2COOM \\ R''-O-SO_3\end{pmatrix}$$

in which:

$x+y$ equals an integer in the range of 2–15,

R'' is alkyl containing from 1–3 carbon atoms,

R'' is alkyl of 1–3 carbon atoms, and

M is an alkali metal.

3. A compound of the following formula:

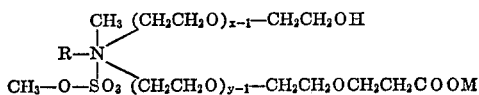

in which:

x+y equals an integer in the range of 2–15,
R is alkyl or alkenyl of 4–22 carbon atoms, and
M is an alkali metal or hydrogen.

4. A compound of the following formula:

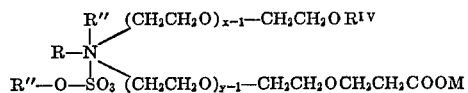

in which:

x+y equals an integer in the range of 2–15,
R is alkyl or alkenyl of from 4–22 carbon atoms,
R'' is alkyl containing from 1–3 carbon atoms,
$R^{IV}$ is H or $C_2H_4COOM$, and
M is an alkali metal or hydrogen.

5. A compound of the following formula:

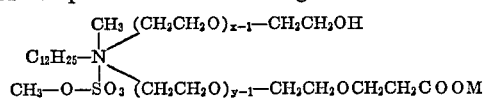

in which:

x+y is an integer in the range of 2–15,
M is an alkali metal.

6. A process for the preparation of carboxyethoxy oxyalkylated quaternary ammonium compounds comprising producing an ethoxylated tertairy amine by reacting from 1 to 15 moles of ethylene oxide with a primary or secondary hydrocarbyl amine selected from the group consisting of alkyl and alkenyl amines and mixtures thereof wherein each hydrocarbyl radical contains from 4 to 22 carbon atoms, reacting said ethoxylated amine with a monomeric alkyl acrylic ester, hydrolyzing the ester obtained by the acrylic ester addition in an alkali hydroxide medium to form as a reaction product the alkali metal salt of the acrylic acid of said ethoxylated amine, and then quaternizing said reaction product with a di-alkyl sulfate containing from 1 to 3 carbon atoms in each alkyl group.

7. The process according to claim 6, wherein said monomeric alkyl acrylic ester is selected from the group consisting of the methyl, ethyl, propyl and butyl esters of acrylic acid.

References Cited

UNITED STATES PATENTS

| | | | |
|---|---|---|---|
| 2,781,392 | 2/1957 | Mannheimer | 260—459 |
| 3,283,005 | 11/1966 | Abend et al. | 260—459 X |
| 3,000,946 | 9/1961 | De Stevens | 260—459 X |
| 2,817,675 | 12/1957 | Hofer et al. | 260—459 |
| 2,918,401 | 12/1959 | Copp | 260—459 X |

LEON ZITVER, Primary Examiner

L. DE CRESCENTE, Assistant Examiner

U.S. Cl. X.R.

252—106, 545, DIG. 7, DIG. 13; 260—429 R, 429.9, 430, 438.1, 498 R, 501.19, 501.21